US008243140B1

(12) United States Patent
Howe

(10) Patent No.: US 8,243,140 B1
(45) Date of Patent: Aug. 14, 2012

(54) DEPLOYABLE CHECKPOINT SYSTEM

(75) Inventor: Bernard D. Howe, City of Browns Summit, NC (US)

(73) Assignee: Elsag North America, LLC, Greensboro, NC (US)

( * ) Notice: Subject to any disclaimer, the term of this patent is extended or adjusted under 35 U.S.C. 154(b) by 774 days.

(21) Appl. No.: 12/362,179

(22) Filed: Jan. 29, 2009

(51) Int. Cl.
*H04N 7/18* (2006.01)

(52) U.S. Cl. ........................................................ 348/149

(58) Field of Classification Search .................. 348/143, 348/148, 149; 705/13
See application file for complete search history.

(56) References Cited

U.S. PATENT DOCUMENTS

2004/0054513 A1* 3/2004 Laird et al. ........................ 703/8
2004/0167861 A1* 8/2004 Hedley .......................... 705/400
2004/0199785 A1* 10/2004 Pederson ...................... 713/200
2006/0251498 A1* 11/2006 Buzzoni et al. ............ 414/139.9
* cited by examiner

*Primary Examiner* — Kenneth R Coulter
(74) *Attorney, Agent, or Firm* — John J. Timar; Womble Carlyle Sandridge & Rice LLP

(57) ABSTRACT

A system and method for conducting traffic surveillance at a deployable checkpoint lane. At least one license plate reader is positioned adjacent to the checkpoint lane, in a predetermined location relative to a license plate reading zone, for acquiring and interpreting images of a license plate on a vehicle transiting through the license plate reading zone. At least one video camera is positioned adjacent to the checkpoint lane for capturing images of the vehicle transiting through the license plate reading zone. A trigger device is positioned adjacent to the checkpoint lane for initiating the capture of video images of the vehicle. A field control unit including a processor and a data store, and cooperative with each digital and video camera, compares images of the license plate on the vehicle and determines which license plate characters and vehicle images to store in a vehicle record to be transmitted to an external database for processing and analysis.

26 Claims, 3 Drawing Sheets

DEPLOYABLE CHECKPOINT SYSTEM

TECHNICAL FIELD

The embodiments of the invention are related generally to traffic surveillance systems and, more particularly, to self-contained traffic surveillance systems that can be deployed to vehicle traffic lanes.

BACKGROUND INFORMATION

Vehicle license plate monitoring is used in a wide variety of traffic surveillance applications including traffic control, controlling access to supervised areas, and identifying stolen vehicles.

License Plate Recognition (LPR) is an image-processing technology used to identify vehicles by their license plates. As used herein, license plate and license plate number refer generally to the alphanumeric character string normally used on license plates. This technology is used in various security and traffic applications including location of stolen vehicles and access-control. LPR technology assumes that all vehicles have their identity displayed and that no additional transponder is required to be installed on the car. An LPR system uses illumination, such as infrared and a camera to take the image of the front or rear of the vehicle. Image-processing software then analyzes the images and extracts the plate information. This data is used for enforcement, data collection, and in access-control applications.

A complete LPR system normally contains the following parts: camera, illumination source, frame grabber, computer, software, hardware, and a database. The illumination source is a controlled light that can brighten up the license plate, and allow both day and night operation. In most cases, the illumination source is infrared, which is invisible to the driver. The frame grabber is an interface board between the camera and the computer, allowing the software to read the image information. The computer is normally a PC running the Windows or Linux operating systems. The computer processor executes the LPR application that controls the system, reads the images, analyzes and identifies the plate, and interfaces with other applications and systems. The software includes the LPR application recognition package. The hardware includes various input/output boards that are used to interface to the external world, such as control boards and networking boards. The database stores recorded events and can be a local database or a central database. The data recorded includes the recognition results.

In the image acquisition subsystem, a miniaturized digital camera is combined with a pulsed infrared LED illuminator that is synchronized with the camera aperture. There are multiple illumination alternatives that may be used in these sensor configurations. In some cases, it is appropriate to use a visible near-infrared LED light source. Using a short wavelength (as low as 735 nanometers) pulse, the illumination source appears as a flashing red light. In other covert applications, an alternative non-visible infrared LED light can be used. In these cases, a longer wavelength (up to 880 nanometers) pulse is used and effective when there is sufficient contrast between the plate characters and the plate background (typically with dark characters on a white or clear background).

The first image processing step is aimed at detecting the presence of any candidate plate from the continuous video flow. When a candidate plate is detected, the result of processing of the input image is definition of a region of interest that contains all of the relevant image features, i.e., discontinuities that may be indications of a plate's presence.

The normalized region of interest is further processed with a two-dimensional digital filter for contrast and edge enhancement to allow the identification and separation of each individual character with respect to the background of the plate. The result of this processing step is a sequence of rectangular boxes (segments) that contain all candidate characters and that may be aligned on a single line or multiple lines, if necessary.

The next step in the character recognition process is the measurement of each candidate's segment with respect to the "models" that have been acquired during a learning phase. This measurement process is based on a statistical technique of feature matching; all characters are described as a sequence of image features and a normalized distance is computed between each character sample and the stored feature models acquired from examples during the learning phase. This distance achieves a minimum value when the most similar character is found in the list of models.

The contextual analysis process then exploits both spatial and syntactic information in order to select the best hypothesis for the number plate. If the image being processed contains N validated characters on a number plate containing K characters, the general idea is to extract all choices of K elements from N and to evaluate them both spatially and syntactically.

The final temporal post-processing stage aims to extract a single number plate for each detected vehicle. This identification is obtained by tracking all recognized characters along the consecutive video frames. All number plate hypotheses that satisfy such tracking process are merged together if they are syntactically similar and are spatially coherent with the assumed vehicle trajectory in the image plane. The result of this temporal integration is an improved accuracy of the recognized plate and the possibility of recovering some character that may appear and disappear in the image during the transit of the plate (e.g., when the plate enters or exits the image frame). The temporal integration is run independently for all plate hypotheses so that multiple transit plates can be tracked and recognized simultaneously.

SUMMARY

In an exemplary embodiment, a system and method are provided for conducting traffic surveillance at a deployable checkpoint lane. At least one license plate reader is positioned adjacent to the checkpoint lane, in a predetermined location relative to a license plate reading zone, for acquiring and interpreting images of a license plate on a vehicle transiting through the license plate reading zone. At least one video camera is positioned adjacent to the checkpoint lane for capturing images of the vehicle transiting through the license plate reading zone. Optionally, at least one video camera can be positioned adjacent to the checkpoint lane for capturing images of an occupant in the vehicle transiting through the license plate reading zone. A trigger device is positioned adjacent to the checkpoint lane for initiating the capture of video images of the vehicle. A field control unit including a processor and a data store, and cooperative with each digital and video camera, compares images of the license plate on the vehicle and determines which license plate characters, and vehicle images to store in a vehicle record to be transmitted to an external database for processing and analysis. In embodiments having both a front and a rear license plate reader, the field control unit compares images of the front and rear license plates and determines which license plate characters to store in the vehicle record.

BRIEF DESCRIPTION OF THE DRAWINGS

These and other advantages and aspects of the present invention will become apparent and more readily appreciated from the following detailed description of the invention taken in conjunction with the accompanying drawings, as follows.

DETAILED DESCRIPTION

The following description is provided as an enabling teaching of exemplary embodiments. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances, and are a part of the invention. Thus, the following description is provided as illustrative of the principles of the embodiments and not in limitation thereof, since the scope of the invention is defined by the claims.

Figure 1:
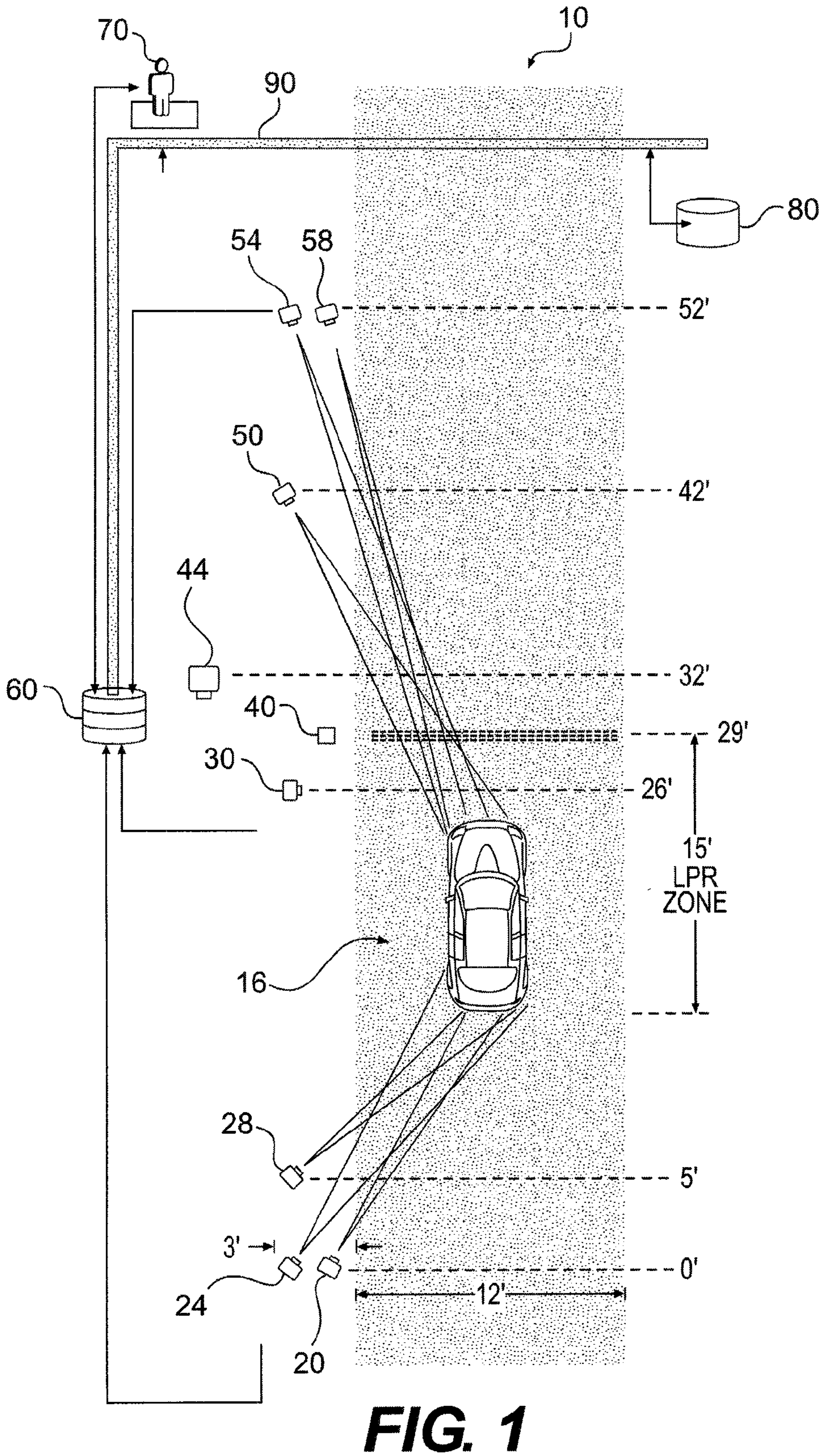
FIG. 1 illustrates the layout of a deployable checkpoint system in accordance with an exemplary embodiment of the invention.

FIG. 1 illustrates the layout of a deployable checkpoint system 10 alongside traffic lane 16 in an exemplary embodiment. The distances between system components shown along the traffic lane 16 are illustrative of an exemplary deployment, and could vary with the actual components utilized in a specific deployment, for example, the distances could be at least a function of camera field of view for the cameras deployed. The deployable checkpoint system 10 utilizes multiple cameras and sensors to acquire the necessary data and images to be integrated into a useful vehicle record. The components of the system illustrated in FIG. 1 can include, but are not limited to: (1) a rear LPR camera 20; (2) a rear vehicle overview camera 24; (3) a rear commercial LPR camera 28; (4) an optional driver side facial camera 30; (5) an optional driver front facial camera 58; (6) a trigger system 40; (7) a front LPR camera 50; (8) a front vehicle overview camera 54; (9) a field control (FCU) 60; and (10) a power generator (not shown) providing a 11 hour supply of power to the system 10. The In other embodiments, fewer components or additional components can be included. For example, a front LPR camera would not be needed in states that only require a single license plate reader at the rear of a vehicle. In other applications of the invention, the front and/or side occupant facial cameras may not be needed.

Also depicted in FIG. 1 is an optional light 44 that can be deployed to enhance officer safety if necessary. Light 44 can also add ambient light to the trigger area surrounding trigger system 40. In some embodiments, the deployable checkpoint system 10 could also include a global positioning system (GPS) for vehicle location instead of traffic lane location coordinates. The deployable checkpoint system 10 can operate at vehicle speeds from zero to 85 miles per hour.

Figure 2:
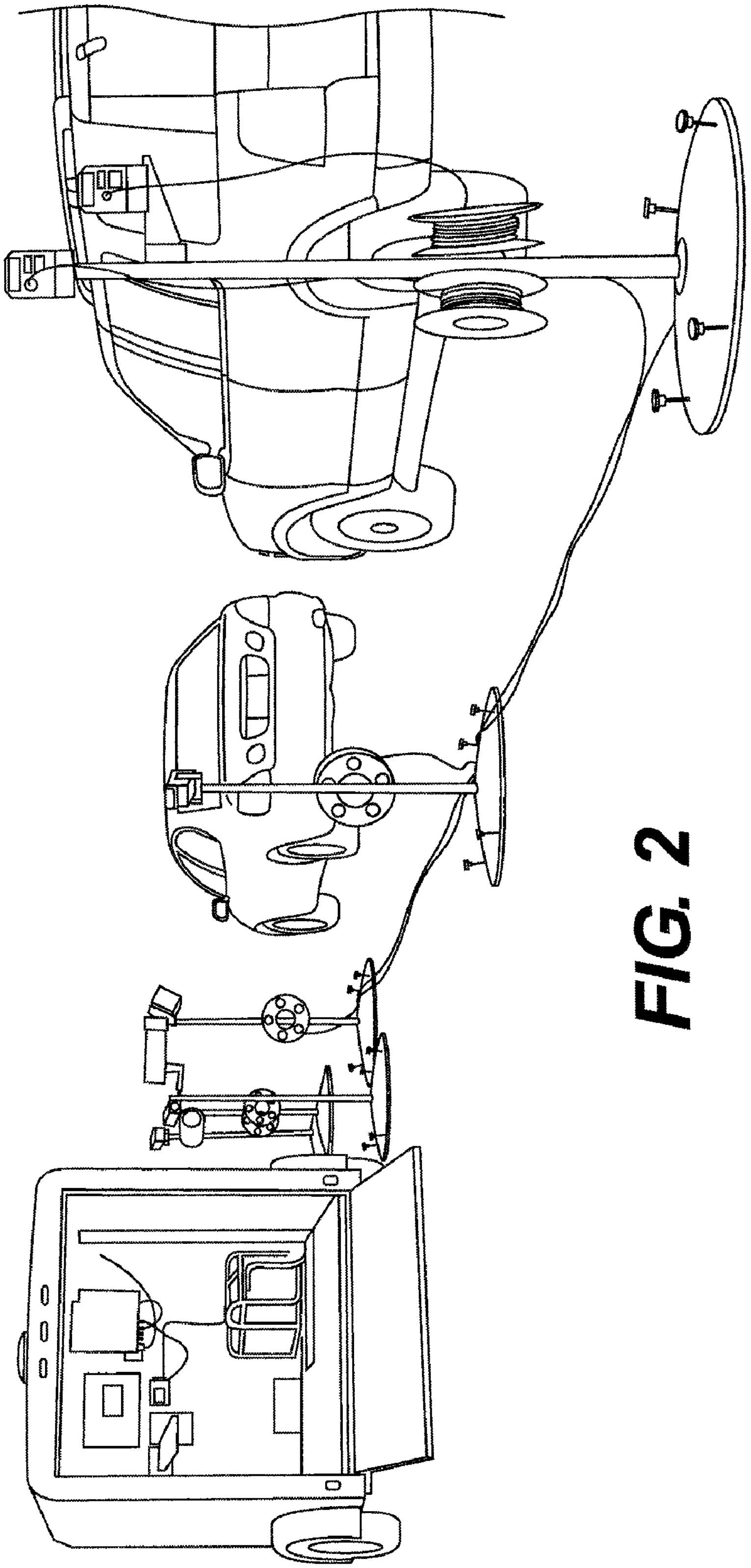
FIG. 2 illustrates the deployment of the checkpoint system in an exemplary embodiment.

In one embodiment, the entire deployable checkpoint system 10 can be mounted in a trailer and transported to the area of interest. FIG. 2 illustrates the deployment of the checkpoint system 10. The LPR and video cameras can be mounted on individual stands when deployed along a traffic lane. The trigger mechanism 40 can also be mounted on a stand alongside the roadway 16, in the middle of the monitored traffic lane. This is particularly advantageous since no inductive coil needs to be positioned across the roadway. In another embodiment, the components of the checkpoint system can be mounted on the external surface of the trailer that can be parked on the side of the roadway to provide a covert operation not readily visible to oncoming vehicles.

The first event in the deployable checkpoint system 10 involves reading the front license plate of the vehicle as it comes into the LPR (License Plate Reading) zone. In an exemplary embodiment, the LPR zone can be in the 15 feet preceding the system trigger that is located at the 29 foot mark as shown in FIG. 1. The 15 foot LPR zone represents the depth of the field of view of the LPR cameras 20, 50 used in this exemplary embodiment. The LPR zone can be larger or smaller in other embodiments depending on the digital camera equipment that is used. All LPR and video cameras in the deployed system are directed at the LPR zone. It is important to understand that the front LPR camera 50 (as all LPR cameras 20, 28 in this system), are free wheeling and continuously searching for, interpreting, and performing Optical Character Recognition (OCR) on all license plates in the zone. In exemplary embodiments, the LPR cameras 20, 50 can be digital microcameras operating at wavelengths in the near infrared range. Each microcamera can be equipped with a pulse-operated LED lighting device to provide illumination in any external lighting condition. As plates are identified, appropriate images and data are time stamped and sent to the Field Control Unit (FCU) 60. This information package is held by the FCU cache for an upcoming matching vehicle record.

The vehicle continues down the lane 16 and crosses the trigger line shown by dashed lines across the lane. The trigger mechanism 40 includes several different triggering and vehicle tracking systems. In one embodiment, the triggering and vehicle tracking systems include ultrasonic, passive infrared, Doppler radar/microwave, and laser technologies. There is redundancy built into triggering system 40, but each technology has a primary function in the system. It is important to note that the system is capable of triggering utilizing any number of differing technological devices. The system could easily trigger on a radiation detector or an undercarriage scanner. As the front of the vehicle crosses the trigger line, it changes the trigger state to "on". When the trigger moves to the "on" state, the FCU 60 initiates multiple functions.

Triggering system 40 includes various detection technologies as noted above. Microwave detectors emit focused high frequency signals within a specified frequency band in the Gigahertz region. Vehicles moving into or through the detection area reflect the signals back to the detector. The direction and speed of the vehicles can be determined very accurately from the Doppler shift between the emitted and received signals. Passive infrared detects changes in thermal radiation contrasts from the background resulting from moving vehicles in the field of view. Passive infrared detectors can be used for counting vehicles, occupancy measurement, presence detection, queue detection, speed assessment, and classification by vehicle length (e.g., car or truck). Ultrasonic detectors emit high frequency acoustic bursts. Vehicles moving through the detection area reflect the signals back to the detector. The distance to the surface of a vehicle is measured from the travel time of the ultrasonic bursts. This active ranging enables vehicle counting and classification. Products that combine these technologies can be used as one component of the triggering system. One such product that can be used in exemplary embodiments is the Xtralis triple technology combination detector model TT292. Laser technology is also included in the triggering system in an exemplary embodiment. A programmable pulsed-laser sensor sends out individual laser pulses and places the pulse returns in fixed increments of flight time. When several pulses end up in a given time bin, the pulsed-laser detector determines that a vehicle is present. One product that can be used as a component of the trigger system 40 is the Universal Laser Sensor (ULS) available from Laser Technology, Inc. The ULS comes in a compact housing and its narrow beam allows for strategic placement in restricted areas. In an exemplary embodiment, both the TT292 and ULS are installed in a trigger system 40 “black box” and mounted on a stand that is positioned adjacent to the lane being monitored. Software integrates and controls operation of the trigger system components. In an exemplary embodiment, the programmable pulsed-laser sensor initially determines vehicle presence, and the signals received by the ultrasound detector are then used for further vehicle data acquisition under control of the software.

The “trigger on” state initiates the creation of a vehicle record. If no plates are detected by the LPR cameras 20, 50, a vehicle record will still be created when the trigger mechanism 40 is activated. This record has a discrete vehicle record ID number. The vehicle record has a time stamp and lane location name or GPS identifier.

The front LPR camera 50 reads and images from the FCU cache are moved into the vehicle record. Any front plate read that was found by the front LPR camera 50 since the last “trigger off” is moved into this vehicle record.

The “trigger on” causes the FCU 60 to request the front overview camera 54 to take a snapshot and move it to the vehicle record in the event that there is no image associated with the front license plate. The type of vehicle transiting the checkpoint lane 16 can be very significant in the deployment of the checkpoint system 10. Certain types of vehicles could be targeted as likely drug carriers or hazardous waste carriers. The data gathered could then be the subject of future investigative work by the DEA or other government agencies.

With the “trigger on,” the FCU 60 requests the rear overview camera 24 to take a snapshot and move it to the vehicle record in the event there is no image associated with the rear license plate.

In some embodiments, a driver front video camera 58 can capture a driver front facial image and input the image acquired into the current vehicle record. A driver side video camera 30 can capture a driver side facial image and input the image acquired into the current vehicle record. The system can be deployed without facial cameras.

For each vehicle passing through the lane 16, the system’s hourly vehicle counter is incremented by one. The vehicle counter is a resetable incremental counter that will store all vehicle passages through the lane 16. The results are capable of being graphically displayed and printed out.

As the vehicle progresses through the lane 16, the rear license plate moves into the LPR zone. The rear LPR camera 20 is free wheeling and continuously monitors the LPR zone for plates. When the rear LPR camera 20 captures a plate, an internal processor performs the OCR, and the rear LPR camera 20 sends the resulting images and character string to the FCU 60. The FCU 60 inserts this read and all rear plate reads from the cache since the last “trigger off” into the current vehicle record.

A commercial rear LPR camera 28 can be inserted into the lane 16 optionally. The commercial rear LPR camera 28 offers a shorter focal length and base, and has the ability to supply an opposing or different field of view. This commercial LPR camera 28 could also pick up hazard placards on vehicles. This can be important with commercial tractor trailer or tandem trailers, where the camera 28 also can read the plates between two trailers. The commercial rear LPR camera 28 is free wheeling and is continuously monitoring the LPR zone for license plates. Once a plate is detected, the camera performs the OCR and then sends the plate information to the FCU 60 to be inserted into the current vehicle record.

As the vehicle progresses down the lane 16, the rear of the vehicle moves past the trigger 40 causing the trigger to change to a “trigger off” status. Once the trigger 40 is in the off state, the current vehicle record is closed.

The FCU 60 serves as the central processing unit and the power supply for the multiple cameras and sensors of the deployable checkpoint system. The FCU 60 allows the system 10 to compare the front and rear license plates. The basic purpose of comparing front and rear license plates is to ensure that the plate reading having the higher degree of accuracy associated with it is the one that is stored in the vehicle record. The FCU 60 is capable of storing vehicle data records for subsequent upload to another computer system. In one exemplary embodiment, the FCU can include a 120 Gigabyte hard drive, and be programmed to upload to a specific site if available. If no specific site is available for uploading the vehicle records, the vehicle records can be stored on the FCU hard drive until the end of a shift, or a checkpoint deployment. Deployments in the present context are generally short term deployments, but can be for extended periods of time, if necessary, assuming the availability of an external power source.

In some embodiments, the FCU 60 can compare a license plate character string from the LPR acquisition subsystem with a list of target plate numbers wanted by law enforcement agencies, and can activate an alarm to notify an officer in a nearby patrol car of a match. The FCU 60 can exchange LPR data with a permanent remote operations center that maintains databases of target license plate numbers of interest for law enforcement purposes.

The entire deployable checkpoint system 10 can be powered by 1500 watts of 120 V AC power, and the FCU 60 can be powered with less than 500 watts of 120 V AC power. As the vehicle records are closed, the FCU 60 pushes the data and images to the customer database 80. This can be accomplished in a variety of ways. The Vehicle Record package can be transmitted from the deployable checkpoint system’s “Lanes” local area network 90 via a hardwire connection to the customer’s wide area network (WAN). Customer, in the present context, can be a federal, state, or local government agency. Examples of customers can include the Drug Enforcement Agency (DEA) at the federal level, the State Highway Patrol at the state level, and the city police department at the local level. If hardwire connectivity to the customer WAN is not available, records can be pushed to the customer location via an onboard encrypted wireless router. This can be accomplished via cellular or 802.11 wireless fidelity (WIFI) technology.

Figure 3:
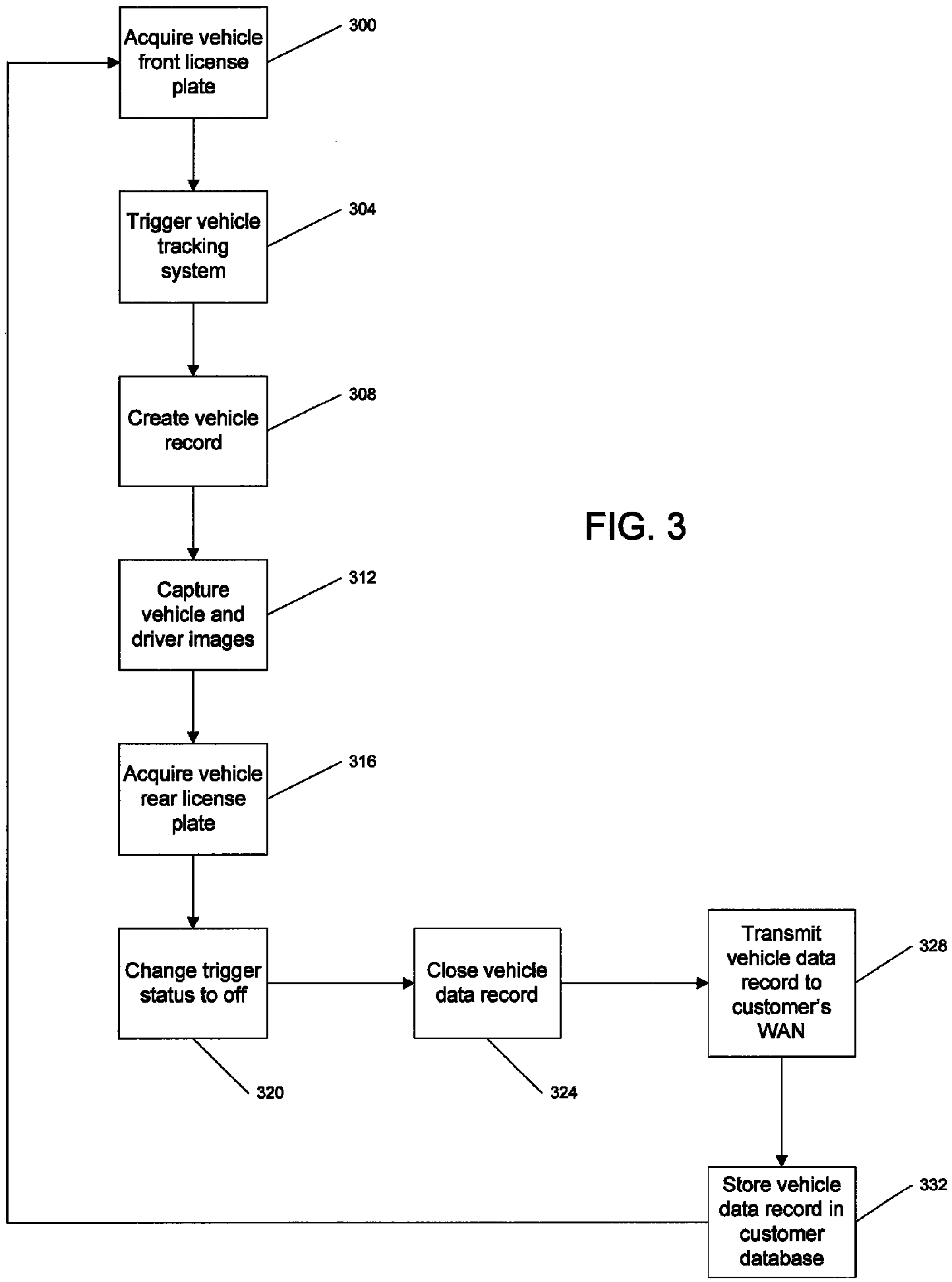
FIG. 3 illustrates the operational steps performed by the deployable checkpoint system in an exemplary embodiment.

FIG. 3 illustrates the operational steps performed by the deployable checkpoint system 10 in an exemplary embodiment. In other embodiments, the deployable checkpoint system 10 can contain more or fewer steps than depicted in FIG. 3. In addition, not all of the steps depicted in FIG. 3 need to be performed in the sequence indicated. The first operation is acquisition of a front license plate of a vehicle by the deployed front license plate reader camera 50 when the vehicle enters the LPR zone as indicated in block 300. The vehicle crosses the "trigger line" in the lane 16 which triggers the vehicle tracking system as indicated in block 304. As discussed above, the trigger mechanism 40 can include any one or more of ultrasonic, passive infrared, radar and laser technologies. For example, a combination of ultrasonic and laser devices can be used in the checkpoint system 10 to trigger the taking of vehicle images. The trigger mechanism 40 could also include radiation detection or under-carriage scanner devices. A radiation detector could be place at the side of the roadway, and the system could then trigger solely when radiation from hazardous material is present. A record is created when a vehicle carrying hazardous radioactive material passes through the checkpoint. The checkpoint could be manned with a patrol or enforcement officer. Having a radiation detector as part of the trigger mechanism 40 can help prevent dumping of radioactive waste into a municipal landfill. If the traffic lane 16 is unmanned, an alarm can be sent out and the vehicle record can be pushed wirelessly to a central command post.

After the vehicle tracking system is triggered, the FCU 60 creates a new vehicle record having a unique vehicle record identifier, as indicated in block 308. The vehicle record also includes a timestamp and location identification. Vehicle overview and driver images are then captured by front 54, 58 and side video cameras 30. A rear video camera 24 can also capture a rear vehicle overview, if no rear license plate is detected (step 316). These steps are indicated in block 312. As the vehicle continues to travel through the lane 16, the rear license plate is acquired by a rear LPR camera 20 as indicated in block 316. As discussed above, the deployable checkpoint system 10 can also include an optional commercial rear LPR camera 28 that can be inserted into the lane. The commercial rear LPR camera 28 offers a shorter focal length and base and can be deployed to detect license plates for commercial tractor trailer or tandem trucks. Once the vehicle passes the trigger mechanism 40, the trigger status is changed to "trigger off" as indicated in block 320.

After the vehicle passes the trigger mechanism 40, the field control unit 60 closes the vehicle tracking record as indicated in block 324. The field control unit 60 then pushes the data and images via the customer's WAN network as indicated in block 328. The data and images can be sent via a hard-wired connection 90 or via a wireless connection to the customer's WAN. The data and images corresponding to the vehicle record are then stored in the customer database 80 for storage and further analysis as indicated in block 332. System users can communicate with the FCU 60 via user interface 70.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiments are possible without departing from the scope of the invention. In addition, it is possible to use some of the features of the embodiments described without the corresponding use of the other features. Accordingly, the foregoing description of the exemplary embodiments is provided for the purpose of illustrating the principles of the invention, and not in limitation thereof, since the scope of the invention is defined solely by the appended claims.

What is claimed is:

1. A portable system for conducting traffic surveillance at a deployable checkpoint lane, comprising:

at least one license plate reader positioned adjacent to the checkpoint lane in a predetermined location relative to a license plate reading zone, for acquiring and interpreting images of a license plate on a vehicle transiting through the license plate reading zone, the license plate reading zone corresponding to a depth of field for the license plate reader;

at least one video camera positioned adjacent to the checkpoint lane for capturing images of the vehicle transiting through the license plate reading zone;

a trigger device positioned adjacent to the checkpoint lane for detecting the vehicle crossing a trigger line while transiting through the license plate reading zone and initiating the capture of video images of the vehicle; and a field control unit including a processor and a data store, and cooperative with each digital and video camera, for comparing images of the license plate on the vehicle and determining which license plate characters and vehicle images to store in a vehicle record to be transmitted to an external database for processing and analysis.

2. The portable system for conducting traffic surveillance of claim 1 wherein each license plate reader comprises:

a digital camera for imaging of vehicle license plates;

an illuminator cooperative with the camera to provide illumination of the vehicle license plates; and an image acquisition and processing device coupled to the camera to acquire images of the vehicle license plates from the camera and to extract a plurality of character strings from each detected license plate.

3. The portable system for conducting traffic surveillance of claim 1 wherein the at least one license plate reader comprises a first license plate reader positioned adjacent to the checkpoint lane in a location relative to the license plate reading zone to capture a front license plate, and a second license plate reader positioned adjacent to the checkpoint lane in a location relative to the license plate reading zone to capture a rear license plate.

4. The portable system for conducting traffic surveillance of claim 3 wherein the field control unit further comprises a cache for temporarily storing the characters detected on the front license plate until a vehicle record is created by the field control unit processor.

5. The portable system for conducting traffic surveillance of claim 3 further comprising an additional rear license plate reader having a digital camera with a short focal length to detect any hazard placards and a license plate affixed to a first trailer of a vehicle including tandem trailers.

6. The portable system for conducting traffic surveillance of claim 1 wherein the at least one video camera for capturing images of the vehicle is located adjacent to a front end of the checkpoint lane.

7. The portable system for conducting traffic surveillance of claim 1 wherein the at least one video camera for capturing images of the vehicle is located adjacent to a rear end of the checkpoint lane.

8. The portable system for conducting traffic surveillance of claim 1 further comprising at least one video camera positioned adjacent to the checkpoint lane for capturing images of an occupant in the vehicle transiting through the license plate reading zone.

9. The portable system for conducting traffic surveillance of claim 8 wherein the at least one video camera for capturing occupant images is located adjacent to a front end of the checkpoint lane for capturing a frontal facial image.

10. The portable system for conducting traffic surveillance of claim 8 wherein the at least one video camera for capturing occupant images is located adjacent to the license plate reading zone for capturing a side view facial image.

11. The portable system for conducting traffic surveillance of claim 1 wherein the trigger device comprises at least one of a laser detector, an ultrasonic receiver, a radar detector, and a passive infrared sensor.

12. The portable system for conducting traffic surveillance of claim 1 wherein the trigger device comprises a radiation detector.

13. The portable system for conducting traffic surveillance of claim 1 wherein the trigger device comprises a vehicle undercarriage scanner.

14. The portable system for conducting traffic surveillance of claim 1 further comprising an auxiliary light positioned adjacent to the checkpoint lane for adding ambient light to an area proximate to the trigger device.

15. A method for conducting traffic surveillance at a deployable checkpoint lane including a license plate reading zone by a portable vehicle detection and imaging system, comprising the steps of:

acquiring and interpreting images of a license plate on a vehicle transiting through the license plate reading zone by at least one license plate reader, the license plate reading zone corresponding to a depth of field for the license plate reader;

triggering a vehicle tracking system when a portable trigger device detects the presence of the vehicle crossing a trigger line while transiting through the license plate reading zone;

creating a vehicle record in a data store by a processor in a field control unit;

capturing images of the vehicle transiting through the license plate reading zone by at least one video camera positioned adjacent to the checkpoint lane;

comparing images of the license plate on the vehicle and determining which license plate characters and vehicle images to store in the vehicle record to be transmitted to an external database for processing and analysis.

16. The method for conducting traffic surveillance at a deployable checkpoint lane of claim 15 wherein the steps of acquiring and interpreting images of the license plate comprise extracting a plurality of character strings on the detected license plate.

17. The method for conducting traffic surveillance at a deployable checkpoint lane of claim 15 wherein the steps of acquiring and interpreting images of the license plate further comprises capturing images of a front license plate by a first license plate reader positioned adjacent to the checkpoint lane in a first location relative to the license plate reading zone, and capturing images of a rear license plate of a vehicle by a second license plate reader positioned adjacent to the checkpoint lane in a second location relative to the license plate reading zone.

18. The method for conducting traffic surveillance at a deployable checkpoint lane of claim 17 further comprising storing the plurality of character strings of the front license plate in a cache of the field control unit until the processor creates the vehicle record.

19. The method for conducting traffic surveillance at a deployable checkpoint lane of claim 15 further comprising capturing images of an occupant in the vehicle transiting through the license plate reading zone by at least one video camera positioned adjacent to the checkpoint lane.

20. The method for conducting traffic surveillance at a deployable checkpoint lane of claim 19 wherein the captured images of the occupant include a side facial image.

21. The method for conducting traffic surveillance at a deployable checkpoint lane of claim 19 wherein the captured images of the occupant include a front facial image.

22. The method for conducting traffic surveillance at a deployable checkpoint lane of claim 15 further comprising detecting if radioactive materials are carried in the vehicle transiting through the license plate reading zone.

23. The method for conducting traffic surveillance at a deployable checkpoint lane of claim 15 further comprising scanning an undercarriage of the vehicle.

24. The method for conducting traffic surveillance at a deployable checkpoint lane of claim 15 further comprising adding a timestamp, and a checkpoint lane location name or global positioning system identifier to the vehicle record.

25. The method for conducting traffic surveillance at a deployable checkpoint lane of claim 15 further comprising positioning an auxiliary light adjacent to the checkpoint lane to add ambient light to an area proximate to the trigger device.

26. The method for conducting traffic surveillance at a deployable checkpoint lane of claim 15 further comprising detecting any hazard placards on the vehicle and a license plate affixed to a first trailer of a vehicle including tandem trailers.

* * * * *